United States Patent
Kapartis

[11] Patent Number: 5,877,416
[45] Date of Patent: Mar. 2, 1999

[54] ANEMOMETER EMPLOYING STANDING WAVE NORMAL TO FLUID FLOW AND TRAVELLING WAVE NORMAL TO STANDING WAVE

[75] Inventor: Savvas Kapartis, London, England

[73] Assignee: FT Technologies Limited, London, England

[21] Appl. No.: 840,205

[22] Filed: Apr. 11, 1997

[30] Foreign Application Priority Data

Apr. 13, 1996 [GB] United Kingdom .................... 9607804

[51] Int. Cl.⁶ .............................. G01F 13/00; G01P 5/18
[52] U.S. Cl. .................................. 73/170.13; 73/170.08; 73/861.27
[58] Field of Search ........................... 73/861.23–861.31, 73/861.85, 170.08, 170.13

[56] References Cited

U.S. PATENT DOCUMENTS 4,890,488  1/1990  Pincent et al. .............................. 73/189
5,343,744  9/1994  Ammann .............................. 73/170.13

FOREIGN PATENT DOCUMENTS 2140160  11/1984  United Kingdom .

*Primary Examiner*—Joseph L. Felber
*Attorney, Agent, or Firm*—Lavhive & Cockfield, LLP

[57] ABSTRACT

An anemometer comprises an acoustic resonant cavity 1 between two plates 2 and 3 and open in the direction of flow of a fluid, the cavity having at least one pair of electro acoustic transducers 5 which are energised at an Eigenfrequency to produce a standing wave perpendicular to the direction of flow of the fluid and a travelling wave perpendicular to the standing wave. By using the time delays or phase shifts between the signal energising a transducer and the signal generated by the response of the other transducer the velocity of flow of the fluid can be calculated. Compensation is provided for changes in the Eigenfrequency caused by changes in the environment.

18 Claims, 2 Drawing Sheets

ANEMOMETER EMPLOYING STANDING WAVE NORMAL TO FLUID FLOW AND TRAVELLING WAVE NORMAL TO STANDING WAVE

BACKGROUND

This invention relates to an anemometer of the type used in the measurement of the speed and direction of movement of air, water and other fluids.

Anemometers of various types are frequently used in meteorology, but suffer from one or more of many disadvantages including the presence of moving parts in mechanical types, a slow and inaccurate response, susceptability to temperature and pressure variation, a maintenance requirement, a complex construction, the dissipation of relatively large amounts of energy, the production of unduly high disturbances in the fluid flow, low sensitivity at low velocities, and a severely restricted maximum velocity range.

An object of this invention is to provide an anemometer which obviates or mitigates at least some of these disadvantages.

Embodiments of the present invention work at very high and very low air velocities, are both fast and accurate, are practically unaffected by changes in air temperature and pressure, are simple in construction and possess no moving parts, require little or no periodic maintenance, dissipate minimal amount of power, cause a negligible disturbance to the fluid being measured, operate under extremely climatic conditions and can be used with other fluids besides air.

SUMMARY OF THE INVENTION

The present invention provides an anemometer including an acoustic resonant cavity which is open in the direction of fluid flow and at least two electro-acoustic transducers for converting electrical signals into acoustic signals or vice-versa and for establishing in the cavity an acoustic standing wave perpendicular to the direction of fluid flow and a travelling wave perpendicular to the standing wave, and an electronic unit which processes the electrical signals to derive the velocity of the fluid inside the acoustic cavity.

The unit may process the signals to derive the direction of fluid flow.

The transducers may be mounted in a plane parallel to the direction of fluid flow.

Preferably the anemometer includes a housing for the electronic unit and a support pillar situated between the acoustic resonant cavity and the housing of the electronic unit.

An embodiment of the present invention will now be described, by way of example, with reference to the accompanying drawings in which:

DESCRIPTION OF ILLUSTRATED EMBODIMENT

Figure 1:
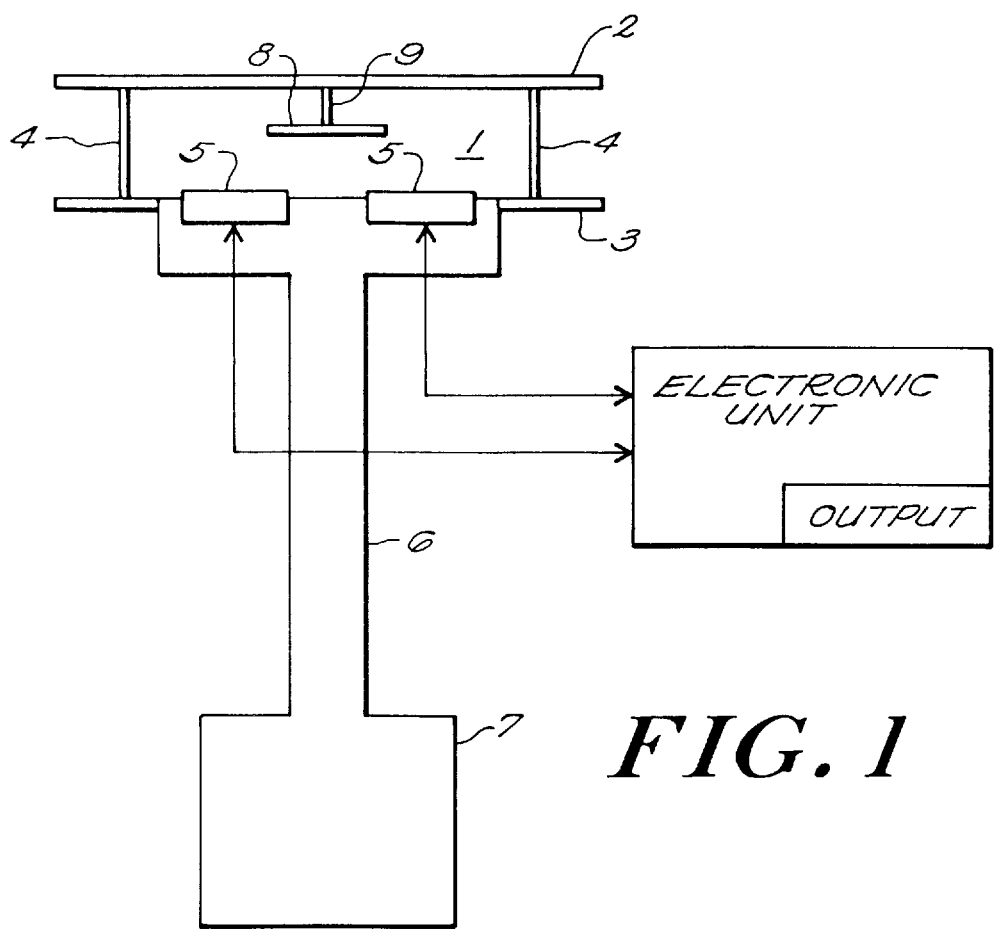
FIG. 1 is a vertical section of an anemometer according to the present invention for measuring the velocity of a flow of air.
Figure 2:
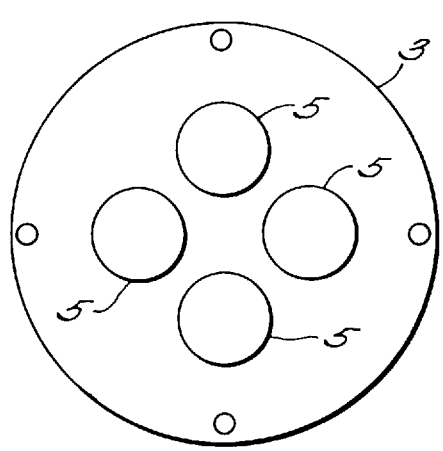
FIG. 2 is a horizontal section through the anemometer of FIG. 1 showing the location of transducers in an acoustic resonant cavity.

As shown in FIG. 1, the anemometer comprises an acoustic resonant cavity 1 formed between an upper reflector 2 and a lower reflector 3. The pair of reflectors are shown in FIGS. 1 and 2 as circular plates of equal size but other shapes and unequal sizes are permissible. The pair of reflectors 2 and 3 are held together by spacers 4, in this embodiment four rods, but again other configurations are possible.

As shown in FIG. 1, the illustrated anemometer is maintained on support rod 6 on a housing 7.

The acoustic resonant cavity 1 operates to support a standing acoustic wave in a direction perpendicular to the direction of air flow, i.e. vertically as shown in FIG. 1, and to support travelling waves in the direction(s) along the air flow, i.e. horizontally as shown in FIG. 1.

It should be noted that the resonant frequency to support the the standing wave is dependent on the frequency of the acoustic signal, the speed of sound, and the separation between the reflectors 2 and 3 which must be an integer multiple of half wavelengths. The size of the reflectors is not critical, and beyond some minimum size required to contain the acoustic signal the resonant frequency is independent of the size of the reflectors which allows for a compact design of the anemometer while retaining aerodynamic efficiency.

Inside the acoustic resonant cavity 1, acoustic waves are generated and received by a number, in this embodiment four, of electro-acoustic transducers 5. The transducers 5 can of any known type such as piezoelectric, inductive, or electrostatic and operate to convert electrical signals into acoustic signals and vice-versa.

In operation any one of the transducers 5 receives an electrical signal generated by an electronic unit FIG. 1 and excites a proportional acoustic signal; by action of the acoustic resonant cavity 1, the acoustic signal is impressed on the other transducers 5 which accept the acoustic signal and generate proportional electrical signals which are, in turn, fed back to the electronic unit for processing.

In propagating from one transducer A to another transducer B the acoustic signal and its derivative electric signal experience a time delay (and equivalent phase shift) which is related to the speed of sound in the medium and the net distance between the transmitting A and receiving B transducers. In still air, an identical time delay is measured when the direction of signal transmission is reversed i.e. from transducer B to A since (a) the distance travelled by the signal and (b) the sound velocity remain the same whether the signal is transmitted from A to B or vice versa.

If the air moves, on the other hand, say from A to B by some speed v, it proportionally increases the net speed of sound in the direction A to B; conversely it proportionally reduces the speed of sound in the direction B to A. Consequently the electronic unit which measures the time delay, or equivalently the phase shift, detects a difference in time delay (and phase shift) when reversing the direction of the signal.

The magnitude of the time delay, and resulting phase shift, is related to the speed of the air along the adjoining line between the pair of transducers. Using a second pair whose adjoining line lies in some other direction the velocity in a second direction can be found.

Figure 3:
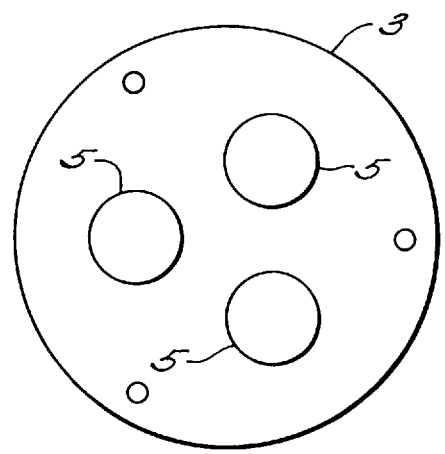
FIG. 3 is a horizontal section similar to FIG. 2 but of a modified embodiment using three transducers in a triangular formation.

It is usually sufficient to know the air speed in just two directions, as speed in any other direction can be derived by mathematical formulae, but more that two pairs may be employed to improve accuracy. For example, in FIG. 3 just three transducers are employed in a triangular formation, and by grouping two transducers at one time, three pairs can be formed, which can sense the speed of air along the directions of the sides of the triangle.

In the direction perpendicular to the air travel, (shown in FIG. 1 as the vertical direction), the resonant acoustic cavity 1 supports an acoustic standing wave. By action of the resonant acoustic cavity 1, this standing wave can exist to any significant magnitude if and only if the frequency of the acoustic signal (and proportional electric signal) belongs to a set of distinct frequency values known as Eigenfrequencies.

The Eigenfrequencies values are dependent on a) the physical dimensions, construction and composition of the resonant acoustic cavity 1 and its boundaries, and on b) the speed of sound in air. Because of the physical boundaries of the acoustic resonant cavity 1, the air velocity in the direction of the standing wave is practically zero and the behaviour of standing wave is unaffected by air movement. However as the speed of sound in air is affected by environmental changes, (primarily temperature) the Eigenfrequencies, or permissible operating frequencies, are altered accordingly.

In operation, the electronic unit senses any change in the speed of sound due to environmental factors, which change manifests itself in a loss of signal amplitude and phase, and takes corrective action to ensure that the acoustic resonant cavity 1 stays in tune. The tuning action can be conveniently carried out by changing the operating frequency.

This last action of the electronic circuit is equivalent to maintaining a fixed operating wavelength in the vertical direction (the direction of the standing wave pattern) which is also the direction of zero air velocity. Under these conditions the indication of the anemometer can be made insensitive to environmental changes.

Air entering the cavity from any direction in the horizontal plane, does not experience any obstacle beside the thin wall of the upper reflector 2 and lower reflector 1. Similarly air travelling inside the cavity does not experience any significant obstacle and hence the indication of the anemometer is truly representative of the air speed and direction.

Figure 4:
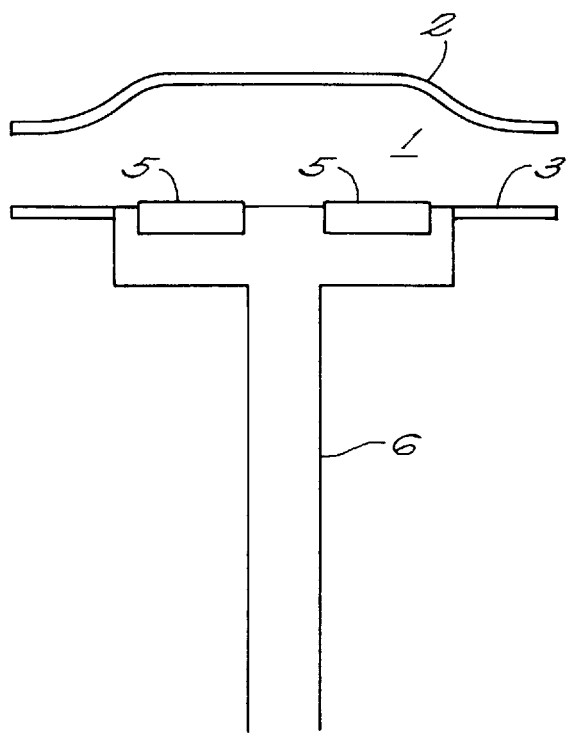
FIG. 4 is a vertical section showing a modified acoustic resonant cavity with restricted air passage for use at high air velocity.

Moreover by spacing the upper reflector 2 or the lower reflector 3 or both, the passage of air can be restricted in a symmetrical manner which does not perturb the indication of direction but it reduces the sensitivity in speed terms thereby enabling the anemometer to cope with extremely large air velocities. FIG. 4 shows a modified acoustic resonant cavity having a shaped upper reflector 2 which restricts the passage of air symmetrically in all horizontal directions and which is suitable for operation at high air velocities. The opposite is also true, and by opening up the entrance of the cavity the sensitivity can be increased.

The basic anemometer of the embodiments previously described measures air flow in the horizontal or xy directions, but by simple modifications it is possible to make a three axis anemometer which is capable of measuring air flow in the vertical or z direction as well. If one or more secondary reflectors is or are inserted in the resonant cavity and spaced from the primary reflectors 2 and 3, then the cavity can be made to resonate at more than one frequency. The new resonances are associated with different acoustic field distributions or eigenfunctions.

As shown in FIG. 1, a secondary reflector 8 in the form of a small circular plate is suspended from the upper reflector 2 by means of a pin 9, but other configurations are possible. This arrangement gives rise to a pair of distinct resonant frequencies. One frequency is primarily associated with the space between the lower reflector 3 and the upper reflector 2, while the second frequency is primarily associated with the space between the lower reflector 3 and the secondary reflector 8.

In operation the electronic unit excites an acoustic wave at a first resonant frequency F1 and measures the average air flow in the cavity space associated with that frequency. The electronic unit also excites an acoustic wave at the second resonant frequency F2 and measures the the average air flow in the cavity space asociated with the second resonant frequency. In practice the pair of measurements can be conducted simultaneously by exciting the two resonances together.

When the air flow is parallel to the plane of the reflectors, near uniform air flow is obtained throughout the cavity volume and the measurements at F1 and F2 agree. If the direction of air flow is inclined at some angle to the plane of the reflectors a non-uniform distribution arises because of the dynamics of air flow in the presence of the body of the anemometer and the measurements at F1 and F2 become unequal by some amount which depends, among other factors, on the angle of inclination. The electronic unit can extract the desired inclination angle from knowledge of the two measurements at F1 and F2.

An anemometer of this type can measure simultaneously air speed and azimuth direction, as explained previously, and by means of the secondary reflector(s) can measure the inclination of the air flow relative to the reflectors and at the same time monitor the cavity response and compensate the readings against environmental changes.

In another application of the invention, the acoustic field distribution of a travelling wave in the direction of fluid flow and a standing wave perpendicular to the direction of flow can be applied to fluids flowing inside pipes to measure the amount of flow. Normally two transducers will be employed and they will be fixed to the wall of the pipe at some distance along the length of the pipe. The wall of the pipe acts in the same way as the reflector arrangement of FIG. 1 but otherwise the measurement of fluid velocity and compensation will be essentially the same as previously described.

Having described the invention, what is claimed is:

1. An anemometer for measuring the speed of a fluid flow comprising
    an acoustic resonant cavity which is open in the direction of fluid flow,
    at least two electro-acoustic transducers disposed within the acoustic resonant cavity for converting between electrical signals and acoustic signals, said transducers being arranged for establishing in the cavity an acoustic standing wave perpendicular to the direction of fluid flow and a travelling wave perpendicular to the standing wave, and
    an electronic circuit connected with said transducers for exciting an acoustic signal and for processing the electrical signals produced from said transducers to determine the speed of fluid flow inside the acoustic cavity.

2. An anemometer as claimed in claim 1, in which the circuit processes the signals to derive the direction of fluid flow.

3. An anemometer as claimed in claim 2, in which the cavity is formed between two reflectors and the transducers are mounted on one of the reflectors.

4. An anemometer as claimed in claim 3, in which the reflectors are parallel plates.

5. An anemometer as claimed in claim 3, in which one reflector is shaped to restrict the passage of fluid flow through the cavity symmetrically in all directions.

6. An anemometer as claimed in claim 3, in which one reflector is shaped to facilitate the passage of fluid through the cavity symmetrically in all directions.

7. An anemometer as claimed in claim 6, in which the transducers are mounted in a plane parallel to the direction of fluid flow.

8. An anemometer as claimed in claim 1 in which the cavity is formed between first and second reflectors and the transducers are mounted on said first reflector for establishing said standing and travelling waves at a first frequency, and further comprising a secondary reflector spaced from said first reflector for establishing, in the cavity and with one of said reflectors, secondary standing and travelling waves at a second frequency different from said first frequency.

9. An anemometer as claimed in claim 1, in which the frequency of the signals is an Eigenfrequency.

10. An anemometer as claimed in claim 9, in which the electronic circuit responds to a change in the speed of sound in the fluid by changing the frequency of the signals.

11. An anemometer as claimed in claim 1 in which said electronic unit and said transducers are arranged and connected for exciting an acoustic signal from each of at least two said transducers, and for processing electrical signals produced in response thereto from each of at least two said transducers.

12. A method of measuring the speed of a fluid comprising the steps of energizing one of at least a pair of electro-acoustic transducers in an acoustic resonant cavity to establish in the cavity an acoustic standing wave perpendicular to the direction of fluid flow and a travelling wave perpendicular to the standing wave, measuring the time delay between energizing said one transducer and the response of at least one other transducer to the travelling wave, and calculating the speed of the fluid as a function of the measured time delay.

13. A method as claimed in claim 12, including repeating the measurements with a second pair of transducers having a spacing therebetween with an orientation that is different from that of the first pair, and using the measurements to derive the direction of flow of the fluid.

14. A method as claimed in claim 13, including energizing the transducers at an Eigenfrequency.

15. A method as claimed in claim 14, including changing the frequency of energization in response to changes in the speed of sound to maintain an optimal response.

16. A method as claimed in claim 15, including maintaining a fixed operating wavelength perpendicular to the direction of fluid flow thereby making the anemometer less sensitive to environmental changes.

17. A method as claimed claim 12, in which the standing and travelling waves are primary waves and including the further step of establishing in said cavity a secondary standing wave and associated secondary travelling wave at a second resonant frequency, measuring the speed of flow using the secondary waves, and comparing the measured speeds using the primary and the secondary waves to measure the inclination of the flow to the plane of the travelling wave.

18. A method of measuring speed of flow of a fluid comprising the steps of energizing one of at least a pair of electro-acoustic transducers in an acoustic resonant cavity to establish in the cavity an acoustic standing wave perpendicular to the direction of fluid flow and a travelling wave perpendicular to the standing wave, measuring the phase shift between said energizing said one transducer and the response of at least one other transducer, energizing at least one other transducer, measuring the phase shift between said energizing of said at least one other transducer and the response of at least one other transducer, and calculating the speed of the fluid as a function of the measured phase shifts.

* * * * *